United States Patent
Gerardiere et al.

(10) Patent No.: US 10,689,880 B2
(45) Date of Patent: Jun. 23, 2020

(54) REMOTE POWER SUPPLY, POSITION SENSOR AND WIRELESS COMMUNICATION DEVICE FOR AN EXTENDABLE DOOR HANDLE

(71) Applicants: Continental Automotive France, Toulouse (FR); Continental Automotive GmbH, Hannover (DE)

(72) Inventors: Olivier Gerardiere, Tournefeuille (FR); Gabriel Spick, Toulouse (FR); Yannis Escalante, Toulouse (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 16/480,364

(22) PCT Filed: Jun. 7, 2018

(86) PCT No.: PCT/FR2018/051314
§ 371 (c)(1),
(2) Date: Jul. 24, 2019

(87) PCT Pub. No.: WO2018/229393
PCT Pub. Date: Dec. 20, 2018

(65) Prior Publication Data
US 2020/0095799 A1  Mar. 26, 2020

(30) Foreign Application Priority Data
Jun. 13, 2017  (FR) ..................... 17 55285

(51) Int. Cl.
*G01R 29/00* (2006.01)
*E05B 5/02* (2006.01)
(Continued)

(52) U.S. Cl.
CPC ............ *E05B 5/003* (2013.01); *B60R 16/03* (2013.01); *E05B 81/88* (2013.01); *H02J 50/10* (2016.02); *H02J 50/90* (2016.02); *H04B 5/0087* (2013.01)

(58) Field of Classification Search
CPC .......... E05B 5/003; E05B 81/88; H02J 50/10; H02J 50/90; B60R 16/03; H04B 5/0087
(Continued)

(56) References Cited

U.S. PATENT DOCUMENTS

2002/0021226 A1* 2/2002 Clement ................ H01H 9/167
340/870.31
2007/0230201 A1 10/2007 Oba et al.
(Continued)

FOREIGN PATENT DOCUMENTS

DE  102015119096 A1 * 5/2017 ............. E05B 85/16
EP  1179827 A1 * 2/2002 ............. H01H 9/168
(Continued)

OTHER PUBLICATIONS

English Translation of the Written Opinion for International Application No. PCT/FR2018/051314, dated Sep. 4, 2018, 7 pages.
(Continued)

*Primary Examiner* — Michael P Nghiem
(74) *Attorney, Agent, or Firm* — RatnerPrestia (57) ABSTRACT

A device for remotely supplying power, through magnetic induction, to a secondary module able to move in relation to a primary module along a predetermined path. An advantageous arrangement of the primary coils of the primary module and of a secondary coil of the secondary module furthermore allows the device to estimate the position of the secondary module. The primary coils are arranged such that: the primary coils form respective magnetic fields oriented in the same direction along their respective axes, during the (Continued)

movement, the inductive coupling between the first primary coil and the secondary coil evolves in the opposite way to the inductive coupling between the second primary coil and the secondary coil, the total inductive coupling existing between the primary coils and the secondary coil is substantially constant regardless of the position of the secondary coil.

11 Claims, 6 Drawing Sheets

(51) Int. Cl.
  *H02J 50/90* (2016.01)
  *H02J 50/10* (2016.01)
  *B60R 16/03* (2006.01)
  *E05B 81/88* (2014.01)
  *H04B 5/00* (2006.01)
(58) Field of Classification Search
  USPC .......................................................... 702/80
  See application file for complete search history.

(56) References Cited

U.S. PATENT DOCUMENTS

| | | |
|---|---|---|
| 2011/0140479 A1 | 6/2011 | Okada et al. |
| 2016/0043567 A1 | 2/2016 | Matsumoto et al. |
| 2016/0117875 A1* | 4/2016 | Duchemin ........... H03K 17/955 340/5.72 |
| 2017/0076519 A1* | 3/2017 | Rabbat .................. G08C 17/02 |
| 2019/0386514 A1* | 12/2019 | Gerardiere ............ E05B 85/107 |

FOREIGN PATENT DOCUMENTS

| | | | |
|---|---|---|---|
| EP | 1445405 A2 | 8/2004 | |
| EP | 1956705 A1 | 8/2008 | |
| FR | 3067528 A1 * | 12/2018 | ............. B60R 16/03 |
| FR | 3067529 A1 * | 12/2018 | ............. E05B 81/80 |
| FR | 3071001 A1 * | 3/2019 | .......... G07C 9/00309 |

OTHER PUBLICATIONS

International Search Report and Written Opinion for International Application No. PCT/FR2018/051314, dated Sep. 4, 2018—11 pages.

* cited by examiner

REMOTE POWER SUPPLY, POSITION SENSOR AND WIRELESS COMMUNICATION DEVICE FOR AN EXTENDABLE DOOR HANDLE

CROSS REFERENCE TO RELATED APPLICATIONS

This application is the U.S. National Phase Application of PCT International Application No. PCT/FR2018/051314, filed Jun. 7, 2018, which claims priority to French Patent Application No. 1755285, filed Jun. 13, 2017, the contents of such applications being incorporated by reference herein.

FIELD OF THE INVENTION

The present invention belongs to the field of electromagnetic induction applied to energy transmission, position sensor and wireless communication functions. The invention relates in particular to a remote power supply, position measurement and wireless communication device for a deployable handle of a motor vehicle door.

BACKGROUND OF THE INVENTION

In a motor vehicle, it is known to use deployable handles for the doors. Such a handle is in the retracted position inside the door most of the time, that is to say that it is flush with the body of the door so as to be virtually invisible, and it is in the deployed position only when a user needs to open the door from outside the vehicle.

There are two main advantages to using a deployable handle. The first advantage is improved aerodynamic performance due to better streamlining of a vehicle when the handles of its doors are in the retracted position. The second advantage concerns esthetics.

A deployable door handle generally incorporates an electronic module, called "door handle module", comprising one or more sensors that make it possible for example to identify the need to deploy the handle, to lock or to unlock the door by detecting the approach of the hand or of a fob of a user.

This door handle module generally communicates information from sensors to a main electronic module, called "door module", contained in the door of the vehicle. The door module is for example responsible for supplying electric power to the door handle module, for communicating therewith, and for driving a motor that makes it possible to deploy the handle. The door module therefore generally incorporates a position sensor for controlling this motor.

It is known to connect a door handle module to a door module using electrical cables so as to supply electric power to the door handle module and possibly to allow information to be exchanged between the two modules in a wired manner.

Such electrical cabling between the door module and the door handle module however entails numerous drawbacks. Specifically, besides the cost and the bulk that they constitute in the door handle module, the electrical cables impose significant mechanical integration constraints, since they have to adapt to the movement of the door handle module without hampering it.

To dispense with electrical cables, it is known for example to use magnetic-induction wireless electric power supply devices. However, such devices are not generally suitable for the case where the element to be charged is able to move in relation to the charging element. It is also known to use inductive sensors to determine the position of a target in relation to the sensor. For example, LVDT (acronym for "linear variable differential transformer") sensors are based on the variation, on the basis of the position of an electrically conductive target, in the voltages induced in two secondary coils by the magnetic field generated by a primary coil. Lastly, there are numerous devices for wireless communication between two electronic modules, such as for example Bluetooth or NFC (acronym for "near-field communication") technology. The proliferation of these devices in an electronic door handle module however goes against the miniaturization thereof and reducing its complexity and its cost.

SUMMARY OF THE INVENTION

The aim of an aspect of the present invention is to rectify all or some of the drawbacks from the prior art, in particular those outlined above.

To this end, and according to a first aspect, the invention relates to a wireless electric power supply device including a primary module and a secondary module. The primary module comprises at least two inductive coils, called "primary coils", and it is configured so as to form an electromagnetic field able to supply electric power to the secondary module through magnetic induction. The secondary module comprises an inductive coil called "secondary coil", and it is able to move in relation to the primary module on a predetermined path. The primary coils and the secondary coil are configured such that:

- the primary coils form respective magnetic fields oriented in the same direction along the respective axes of said primary coils,
- when the secondary module moves, the secondary coil moves from a first primary coil to a second primary coil, the amplitude of the magnetic field flux generated by the first primary coil through the secondary coil evolving in the opposite way to the amplitude of the magnetic field flux generated by the second primary coil through the secondary coil,
- the amplitude of the total magnetic field flux generated by the set of primary coils through the secondary coil is substantially constant regardless of the position of the secondary coil on the path.

By way of such provisions, it is possible to use the primary coils and the secondary coil not only to transmit energy through inductive coupling, but also to estimate the position of the secondary module on the basis of values representative of the amplitude of the magnetic field flux generated by each primary coil through the secondary coil, or in other words, on the basis of values representative of the inductive coupling existing between each primary coil and the secondary coil.

The meaning of "amplitude of the magnetic field flux" is defined below. As a reminder, the flux of the magnetic field $\vec{B}$ through an infinitesimal element of oriented surface area $d\vec{S}$ is the scalar product of these two vectors. The flux of the magnetic field $\vec{B}$ through a surface area S defined by the secondary coil is then the integral:

$$\phi = \iint_S \vec{B} \cdot d\vec{S}$$

Also, the magnetic field $\vec{B}$ in a coil whose turns are circular is oriented along the axis of the coil, and its amplitude is defined theoretically by:

$$B = \mu_0 \frac{N \cdot i}{l} \qquad (1)$$

in which expression $\mu_0$ is the magnetic permeability of free space, N is the number of turns of the coil, l is the length of the coil, and i is the current flowing through the turns of the coil.

Ignoring the effects at the edges of the coil, that is to say considering the field B to be constant and defined by (1) at any point of a surface area S of a cross section of the coil, the magnetic field flux generated by the coil and passing through the secondary coil is then, as a first approximation:

$$\phi = B \cdot S = \mu_0 \frac{N \cdot i}{l} \cdot S \qquad (2)$$

If the current i flowing through the coil varies, for example in the form of a sinusoidal AC current, then the same applies for the magnetic field flux passing through the surface area S. For the remainder of the description, "the amplitude of the magnetic field flux" is defined as being the maximum value that the flux of the magnetic field is able to take at a given instant. This corresponds to the envelope of the signal that represents the variation in the magnetic field flux over time. Thus, if the current i flowing through the coil is a sinusoidal AC current, it may be expressed in the form $i = A \cdot \sin(\omega \cdot t)$, in which expression $\omega$ corresponds to the angular frequency of said sinusoidal AC current, then the amplitude of the magnetic field flux may be expressed, with reference to expression (2) above, using the following expression:

$$\varphi = \mu_0 \frac{N \cdot A}{l} \cdot S \qquad (3)$$

The magnetic field generated by a primary coil and passing through a secondary coil placed facing said primary coil will depend on several factors, such as for example the distance between the primary coil and the secondary coil or else the shape of the turns. However, with reference to formulae (2) and (3), it is understood that, for the device according to an aspect of the invention, the amplitude of the magnetic field flux generated by a primary coil through the secondary coil may vary during the movement of the secondary coil, for example depending on the surface area of said secondary coil facing the primary coil, or else depending on the number of turns of said primary coil facing the secondary coil.

In addition, as the amplitude of the total magnetic field flux generated by the set of primary coils through the secondary coil is substantially constant during the movement of the secondary module, this allows a continuous remote supply of power to the secondary module by the primary module regardless of the position of the secondary module.

The expression "substantially constant" is understood to mean for example that the value of the amplitude of the total magnetic field flux generated by the set of primary coils through the secondary coil is always greater than at least 80%, and preferably greater than 90%, of its maximum value during the movement of the secondary module.

In particular embodiments, aspects of the invention may furthermore include one or more of the following features, taken alone or in any technically feasible combination.

In particular embodiments, the primary module includes an electronic circuit, called "control circuit", configured so as to measure, for each primary coil, a parameter representative of the amplitude of the magnetic field flux generated by the primary coil under consideration through the secondary coil, and so as to estimate the position of the secondary module in relation to the primary module on the basis of said measurements.

In particular embodiments, the parameter representative of the amplitude of the magnetic field flux generated by a primary coil through the secondary coil is an amplitude of a strength of a load current flowing in said primary coil.

By matching a unique set of values of the amplitudes of the strengths of the load currents measured in the primary coils for example to each position of the secondary module on the path that it takes in relation to the primary module, it is possible, on the basis of these measurements, to estimate the position of the secondary module on said path.

In particular embodiments, the control circuit of the primary module is furthermore configured so as to control, on the basis of the estimated position of the secondary module, a motor that moves said secondary module in relation to the primary module.

In particular embodiments, the control circuit of the primary module is furthermore configured so as to modulate the amplitude of a voltage across the terminals of the primary coils on the basis of an item of information to be transmitted to the secondary module.

In particular embodiments, the secondary module furthermore includes an electronic circuit, called "transmission circuit", configured so as to modulate the amplitude of a voltage across the terminals of the secondary coil on the basis of an item of information to be transmitted to the primary module.

In particular embodiments, the secondary module includes an electronic circuit, called "remote power supply circuit", configured so as to recover the electrical energy transmitted through magnetic induction between at least one of the primary coils and the secondary coil so as to supply the secondary module with a DC-voltage electric power supply regardless of the position of the secondary module.

In particular embodiments, the path followed by the secondary module corresponds to a translational movement of said secondary module in relation to the primary module.

In particular embodiments, the primary coils and the secondary coil are configured such that:
  when the secondary module moves, the secondary coil moves from a first primary coil to a second primary coil, the surface area of the first primary coil facing the secondary coil evolving in the opposite way to the surface area of the second primary coil facing the secondary coil,
  the sum of the surface areas of the primary coils facing the secondary coil is substantially constant regardless of the position of the secondary coil.

Thus, the inductive coupling existing between one of the primary coils and the secondary coil evolves depending on the surface area of said primary coil facing said secondary coil. Specifically, the greater the surface area of a primary coil facing the secondary coil, the greater the amplitude of the magnetic field flux generated by said primary coil through the secondary coil, in other words the stronger the inductive coupling existing between these two coils. By contrast, the smaller the surface area of a primary coil facing the secondary coil, the lower the amplitude of the magnetic field flux generated by said primary coil through the secondary coil, in other words the weaker the inductive coupling existing between these two coils.

In particular embodiments:

the first primary coil and the second primary coil have respective parallel axes and have identical right-angled triangle shapes in a plane orthogonal to said axes, the first primary coil and the second primary coil are arranged such that the two right-angled triangles form a rectangle, the hypotenuses of the right-angled triangles being positioned facing one another and forming a diagonal of the rectangle, the secondary coil has the shape of a rectangle in a plane orthogonal to the axis of said secondary coil, the secondary module moves in a translational movement along the length or the width of the rectangle formed by the first primary coil and the second primary coil.

Such a configuration of the primary coils and of the secondary coil makes it possible to obtain a significant travel length for the path of the secondary module using only two primary coils.

In particular embodiments, when the secondary module moves, the secondary coil moves from a first primary coil to a second primary coil, the number of turns of the first primary coil facing the secondary coil evolving in the opposite way to the number of turns of the second primary coil facing the secondary coil.

The inductive coupling existing between one of the primary coils and a secondary coil thus evolves depending on the number of turns of said primary coil facing said secondary coil. A non-homogeneous distribution of the turns of a primary coil on the path of the movement of the secondary module is specifically another way of varying the amplitude of the magnetic field flux generated by said primary coil through the secondary coil during the movement of the secondary module.

According to a second aspect, the invention relates to a system including a motor vehicle door and a handle able to be deployed in relation to said door. The system includes a wireless electric power supply device according to any one of the above embodiments, the primary module being integrated into the door and the secondary module being integrated into the handle.

According to a third aspect, the invention relates to a motor vehicle including a system according to any one of the embodiments of the invention.

BRIEF DESCRIPTION OF THE DRAWINGS

Aspects of the invention will be better understood upon reading the following description, given by way of completely nonlimiting example and with reference to the following figures, in which.

In these figures, identical references from one figure to another denote identical or analogous elements. For the sake of clarity, the elements that are shown are not to scale, unless stated otherwise.

DETAILED DESCRIPTION OF THE PREFERRED EMBODIMENTS

As indicated above, an aspect of the present invention relates to a device for remotely supplying power to a secondary module able to move in relation to a primary module, the device being able to be used to furthermore perform other functions, such as for example estimating the position of the secondary module or else for wireless communication between the two modules.

"Remotely supplying power" or "remote power supply" is understood to mean the wireless transmission of electrical energy from the primary module to the secondary module through electromagnetic coupling.

Figure 8:
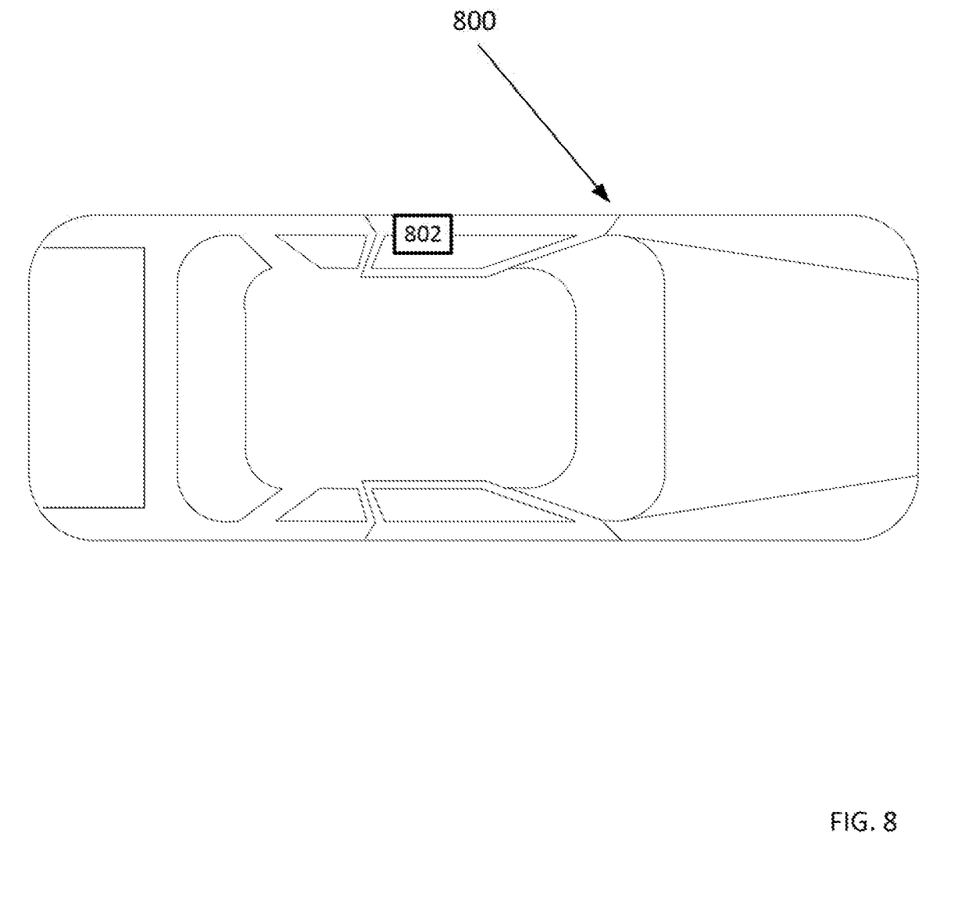
FIG. 8 shows motor vehicle having a motor for deploying a handle.

Such a remote power supply device is applied to particular advantage, although without any limitation, to the production of a system for a motor vehicle 800 shown in FIG. 8, comprising a door module and a deployable door handle module. The door module is for example responsible for supplying electrical energy to the door handle module, for communicating therewith, and for driving a motor 802 that makes it possible to deploy the handle.

In the remainder of the description, the scenario is adopted, by way of nonlimiting example, in which such a device is used to produce a motor vehicle door with a deployable handle. It should be noted in this example that the term "door" may refer equally to a side door, a trunk door, or else any other type of opening element.

Figure 1:
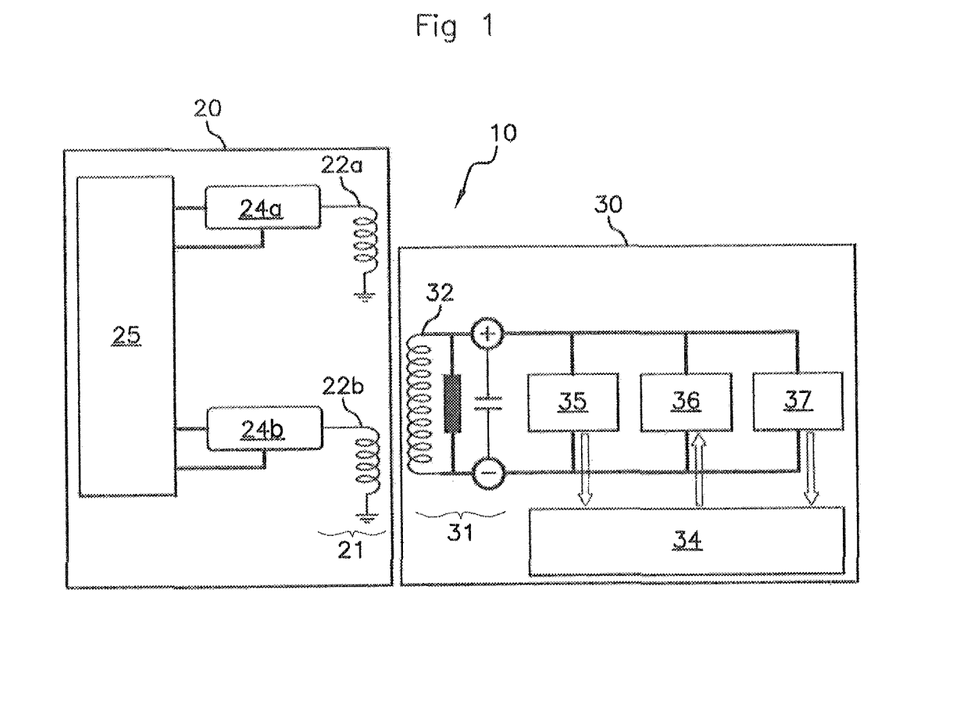
FIG. 1 shows a schematic depiction of a primary module and of a secondary module for a device according to an aspect of the invention.

FIG. 1 schematically shows one embodiment of such a device 10. It comprises a primary module 20 and a secondary module 30. In the case described here in which the device 10 is used to produce a door with a deployable handle, the primary module 20 corresponds to the door module, and the secondary module 30 corresponds to the door handle module.

The primary module 20 comprises, in the example shown, several electronic circuits. One of these electronic circuits, called "primary circuit" 21, comprises two primary coils 22a and 22b. The primary circuit is for example supplied with electric power by an AC voltage supplied by the primary module 20. In our example in which the primary module 20 is a motor vehicle door module, the primary module is supplied with power by the electrical network of the vehicle. An AC current therefore flows in each primary coil 22a and 22b. The amplitude of the strength of the electric current in each primary coil 22a, 22b varies depending on the stronger or weaker magnetic coupling existing between the primary coil 22a, 22 *b* under consideration and a secondary coil 32 belonging to the secondary module 30 and placed facing all or some of said primary coils 22a, 22b. It should be noted that this variation in the amplitude of the strength of the electric current flowing in each primary coil 22a, 22b is observed because the primary circuit 21 is supplied by a voltage generator, and each primary coil 22a, 22b is therefore attacked with a voltage. It would also be possible to take the scenario of attacking the primary coils 22a, 22b with a current, by supplying the primary circuit 21 with a current generator. In this case, it is a variation in the amplitude of the voltage across the terminals of each primary coil that would be observed. Each primary coil 22a and 22b is for example respectively associated with an electronic impedance-matching and decoupling circuit 24a and 24b making it possible in particular, as is conventional, to optimize the transfer of electrical energy between each primary coil 22a, 22b and the secondary coil 32. The primary module 20 also comprises an electronic control circuit 25 that may comprise, as is conventional, one or more microcontrollers, and/or programmable logic circuits (of FPGA, PLD, etc. type) and/or specialized integrated circuits (ASIC), and/or a set of discrete electronic components, and a set of means, considered to be known to those skilled in the art for performing signal processing (analog filter, amplifier, analog-to-digital converter, sampler, etc.). As will be described later on with reference to FIGS. 7A-7D, the control circuit 25 uses, as input parameters, the voltage or current variations in the primary coils 22a and 22b to estimate the position of said secondary module 30 in relation to the primary module 20 and to decode signals containing information transmitted by the secondary module 30. It is also able to drive the motor responsible for deploying the door handle. The motor is controlled on the basis of the estimated position of the secondary module 30 in relation to the primary module 20. The control circuit 25 may also modulate the amplitude of the voltage applied across the terminals of the primary coils 22a and 22b so as to encode signals containing information to be transmitted to the secondary module 30. The impedance-matching and decoupling circuits 24a and 24b may possibly be integrated into the control circuit 25.

The secondary module 30 comprises, in the example shown, several electronic circuits. One of these electronic circuits, called "secondary circuit" 31, comprises a secondary coil 32. The secondary module 30 is able to move in relation to the primary module 20 along a predetermined path, which is such that the secondary coil 32 always remains facing at least part of at least one of the primary coils 22a and 22b. The secondary coil 32 is then the recipient of currents induced by the magnetic fields generated by the flow of an AC electric current in the primary coils 22a and 22b. The secondary module 30 also comprises an electronic control circuit 34 that may comprise, as is conventional, one or more microcontrollers, and/or programmable logic circuits (of FPGA, PLD, etc. type), and/or specialized integrated circuits (ASIC), and/or a set of discrete electronic components, and one or more sensors for detecting for example the approach of the hand or of a fob of a user, which may ultimately then trigger the deployment of the handle, the locking or the unlocking of the door. The control circuit 34 may also be configured so as to decode signals containing information transmitted by the primary module 20. Such signals are received via a reception circuit 35. The control circuit 34 may also be configured so as to encode signals containing information to be transmitted to the primary module 20. Such signals are transmitted via a transmission circuit 36. The reception circuit 35 and the transmission circuit 36 for this purpose include a set of means considered to be known to those skilled in the art (analog filter, amplifier, analog-to-digital converter, etc.). A remote power supply circuit 37 makes it possible to recover the electrical energy transmitted through magnetic induction between the primary coils 22a and 22b and the secondary coil 32 in order to supply electric power to the secondary module 30. It may for example include a rectifier (AC-to-DC converter) for supplying power to the control circuit 34, the reception circuit 35 and the transmission circuit 36 with a DC voltage or current from the AC voltage or current induced in the secondary coil 32.

The design of the electronic matching and decoupling circuits 24a and 24b, control circuits 25 and 34, reception circuit 35, transmission circuit 36 and remote power supply circuit 37 are considered to be known to those skilled in the art, and only the embodiments of the primary circuit 21 and secondary circuit 31 will be described in the remainder of the description.

Figure 2:
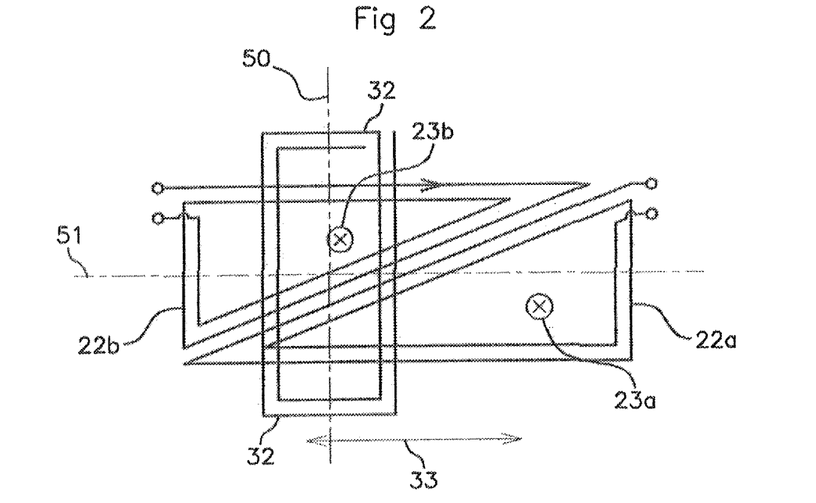
FIG. 2 shows a schematic depiction of one preferred embodiment for the arrangement of two primary coils and of a secondary coil.

FIG. 2 schematically shows one preferred embodiment with regard to the arrangement of the two primary coils 22a and 22b of the primary circuit 21 and of the secondary coil 32 of the secondary circuit 31.

In this preferred embodiment, the primary coils 22a and 22b have respectively parallel axes and have identical right-angled triangle shapes in a plane orthogonal to said axes. The primary coils 22a, 22b are arranged such that the two identical right-angled triangles form a rectangle, the hypotenuses of the right-angled triangles being positioned facing one another and forming a diagonal of the rectangle.

The axis of the secondary coil 32 is parallel to the axes of the primary coils 22a and 22b. The secondary coil has the shape of a rectangle in a plane orthogonal to the axis of said secondary coil. Advantageously, the longitudinal axis 50 of the rectangle formed by the secondary coil 32 is perpendicular to the longitudinal axis 51 of the rectangle formed by the set of two primary coils 22a, 22b, and the length of the rectangle formed by the secondary coil 32 is greater than or equal to the width of the rectangle formed by the set of two primary coils 22a, 22b, so as to optimize firstly the sum of the surface areas of the primary coils facing the secondary coil, and secondly the travel length along which this sum remains constant.

The primary coils 22a, 22b and the secondary coil 32 may include one or more substantially superimposed turns. They may be formed for example of tracks traced on printed circuit boards on which the primary circuit 21 and the secondary circuit 31 are respectively integrated. The printed circuits respectively containing the primary circuit 21 and the secondary circuit 31 are then placed in two parallel planes separated by a short distance, for example a few millimeters, or even a few centimeters at most, so as to ensure optimum inductive coupling between the primary coils 22a, 22b and the secondary coil 32.

According to other embodiments, the primary coils 22a, 22b and the secondary coil 32 may consist of the winding of several turns that are then superimposed about their respective axis.

In preferred embodiments, the primary coils include the same number of turns, which may be equal to one.

The primary coils 22a and 22b are supplied with electric power by the primary module 20, such that the magnetic fields 23a and 23b generated respectively by the flow of an AC current in the primary coils 22a and 22b are oriented in the same direction along the axis of said primary coils.

When the secondary module 30 moves, the path 33 of the secondary circuit 31 in relation to the primary circuit 21 is a linear translational movement along the longitudinal axis of the rectangle formed by the set of two primary coils 22a, 22b. The secondary coil 32 may then move from a position in which it is primarily facing the primary coil 22a (on the right in FIG. 2) to a position in which it is primarily facing the secondary coil 22b (on the left in FIG. 2), and vice versa. This movement is such that the secondary coil 32 always remains facing at least part of at least one of the two primary coils 22a and 22b.

Thus, advantageously, the shape and the arrangement of the primary coils 22a, 22b and of the secondary coil 32 are such that, during the movement of the secondary coil 32, the surface area of the primary coil 22a that is facing the secondary coil 32 evolves in the opposite way to the surface area of the primary coil 22b that is facing the secondary coil 32. Therefore, the movement of the secondary coil 32 is limited such that the sum of these two surface areas is substantially constant regardless of the position of the secondary coil on the path 33. "Substantially constant" is understood to mean for example that the value of this sum is always greater than at least 80%, preferably greater than 90%, of its maximum value during the movement of the secondary module 30 along the path 33.

The same applies for the amplitude of the magnetic field flux generated by each of the primary coils 22a, 22b through the secondary coil 32. Thus, the amplitude of the magnetic field flux generated by the first primary coil 22a through the secondary coil 32 evolves during the movement of the secondary coil 32 in the opposite way to the amplitude of the magnetic field flux generated by the second primary coil 22b through the secondary coil 32, and the amplitude of the total magnetic field flux generated by the set of two primary coils 22a and 22b through the secondary coil 32 is substantially constant regardless of the position of the secondary coil. The advantages that result from this will be described hereinafter in the description of FIGS. 7A-7D.

During the linear movement of the secondary circuit 31 in relation to the primary circuit 21, the travel length of the secondary coil 32 may be defined as being the maximum distance that the secondary coil 32 is able to cover while still remaining facing all or part of at least one of the primary coils 22a and 22b such that:

the sum of the surface areas of the primary coils 22a, 22b facing the secondary coil 32 is constant, and
the surface areas of the primary coils 22a, 22b facing the secondary coil 32 vary during the movement.

In the preferred arrangement of the primary coils 22a, 22b and of the secondary coil 32 shown by FIG. 2, the travel length is equal to the length of the rectangle formed by the set of two primary coils minus the width of the rectangle formed by the secondary coil.

It should be noted that other shapes and other arrangements of the primary coils and of the secondary coil may be contemplated, and these are merely variants of aspects of the invention.

Figure 3:
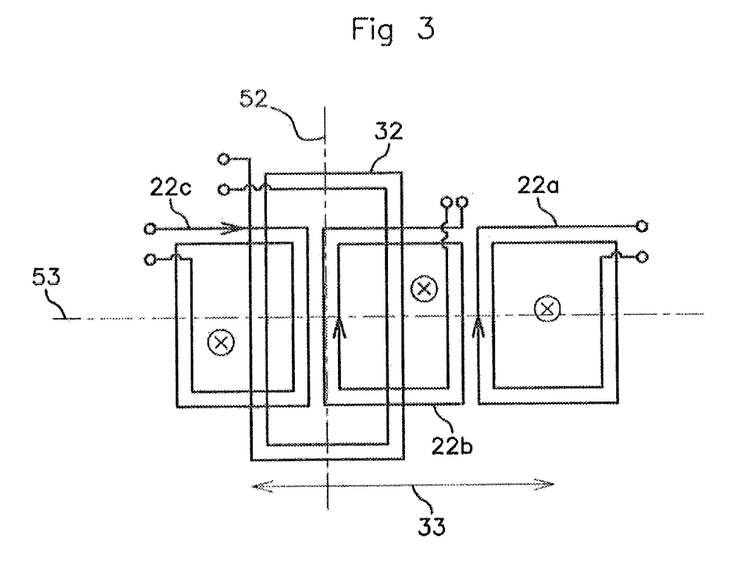
FIG. 3 shows a schematic depiction of another embodiment with three primary coils.

For example, FIG. 3 schematically shows another embodiment with regard to the arrangement of the primary coils 22a, 22b and of the secondary coil 32. In this example, the primary circuit includes three primary coils 22a, 22b, 22c positioned side-by-side along an axis 53 and all having the shape of one and the same rectangle. The secondary coil 32 has the shape of a rectangle whose longitudinal axis 52 is orthogonal to the axis 53 and whose width is equal to or greater than the width of each primary coil 22a, 22b, 22c so as to guarantee abovementioned condition b). In this example, and to meet abovementioned condition a), the travel length is equal to the sum of the widths of the primary coils 22a, 22b, 22c minus the width of the secondary coil 32.

This example may of course be applied generally to a greater number of primary coils so as to increase the travel length of the secondary coil and thus increase the amplitude of the movement of the secondary module in relation to the primary module. It would also be possible to use only two primary coils, but the travel length of the secondary coil would be less.

Figure 4:
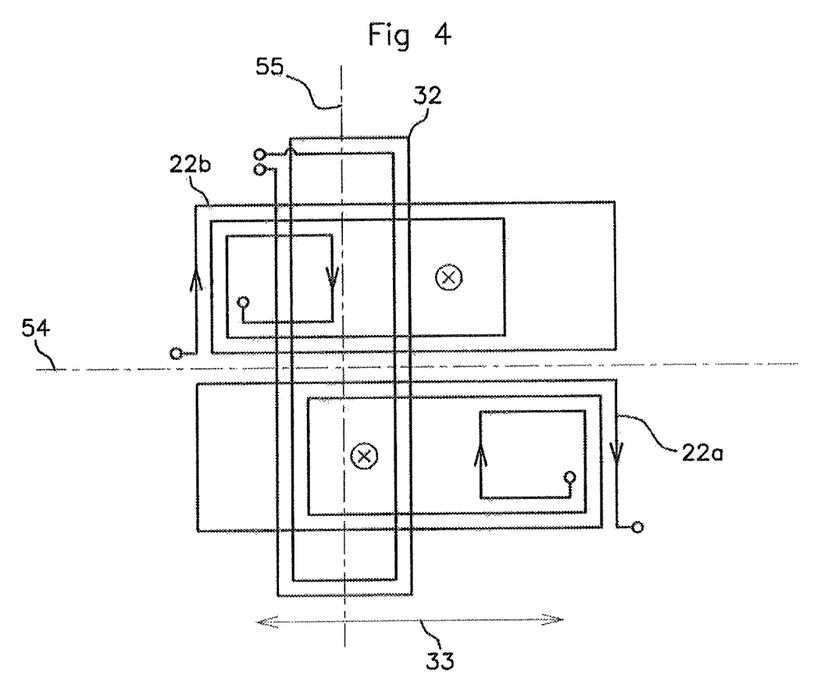
FIG. 4 shows a schematic depiction of another embodiment in which the turns of a primary coil are distributed in a non-homogeneous manner.

FIG. 4 schematically shows another embodiment in which the variation in the amplitude of the magnetic field flux generated by a primary coil 22a or 22b through the secondary coil 32 during the movement of the secondary circuit 31 in relation to the primary circuit 21 is dependent not on the surface area of said primary coil facing the secondary coil, but rather dependent on the number of turns of said primary coil 22a, 22b facing the secondary coil 32. Specifically, in this particular embodiment, the distribution of the number of turns of a primary, coil 22a or 22b is not homogeneous along the path 33. Thus, the number of turns of a primary coil 22a or 22b facing the secondary coil 32 varies during the movement of the secondary circuit 31 in relation to the primary circuit 21. The same applies for the amplitude of the magnetic field flux generated by each primary coil 22a, 22b through the secondary coil 32. In this example, the primary circuit 21 includes two primary coils 22a and 22b of identical shape. Each coil is formed for example of a rectangular spiral-shaped track traced on a printed circuit board. However, the spiral is not regular, such that the number of windings is greater on one side of the rectangle than on the other. The two primary coils 22a, 22b are positioned side-by-side along an axis 54 corresponding to the direction of their largest dimension, such that the side of a primary coil 22a having the most windings is placed on the side of the other primary coil 22b having the fewest windings. The secondary coil 32 has the shape of a rectangle whose longitudinal axis 55 is orthogonal to the axis 54 and whose length is preferably greater than or equal to the sum of the widths of the primary coils 22a, 22b. The width of the secondary coil 32 and the distribution of the turns of each primary coil 22a, 22b are chosen such that the amplitude of the total magnetic field flux generated by the set of primary coils 22a, 22b through the secondary coil 32 is substantially constant regardless of the position of the secondary coil 32 during the movement of the secondary circuit 31 in relation to the primary circuit 21. In this particular embodiment, the secondary coil 32 is then able to move from a position in which it is primarily facing the primary coil 22a (on the right in FIG. 2) to a position in which it is primarily facing the secondary coil 22b (on the left in FIG. 2), and vice versa. The travel length of the secondary coil 32 is equal to the length of a primary coil minus the width of the secondary coil.

It should also be noted that other types of movement of the secondary coil 32 in relation to the primary coils 22a, 22b may be contemplated, such as for example a circular movement.

In the remainder of the description, unless explicitly stated otherwise, the scenario will be taken of the preferred embodiment described by FIG. 2 with regard to the arrangement of the primary coils 22a and 22b and of the secondary coil 32.

FIGS. 5A-5D highlight several schematic depictions of the primary module and of the secondary module depending on whether the door handle is in the retracted or deployed position.

Figure 5:
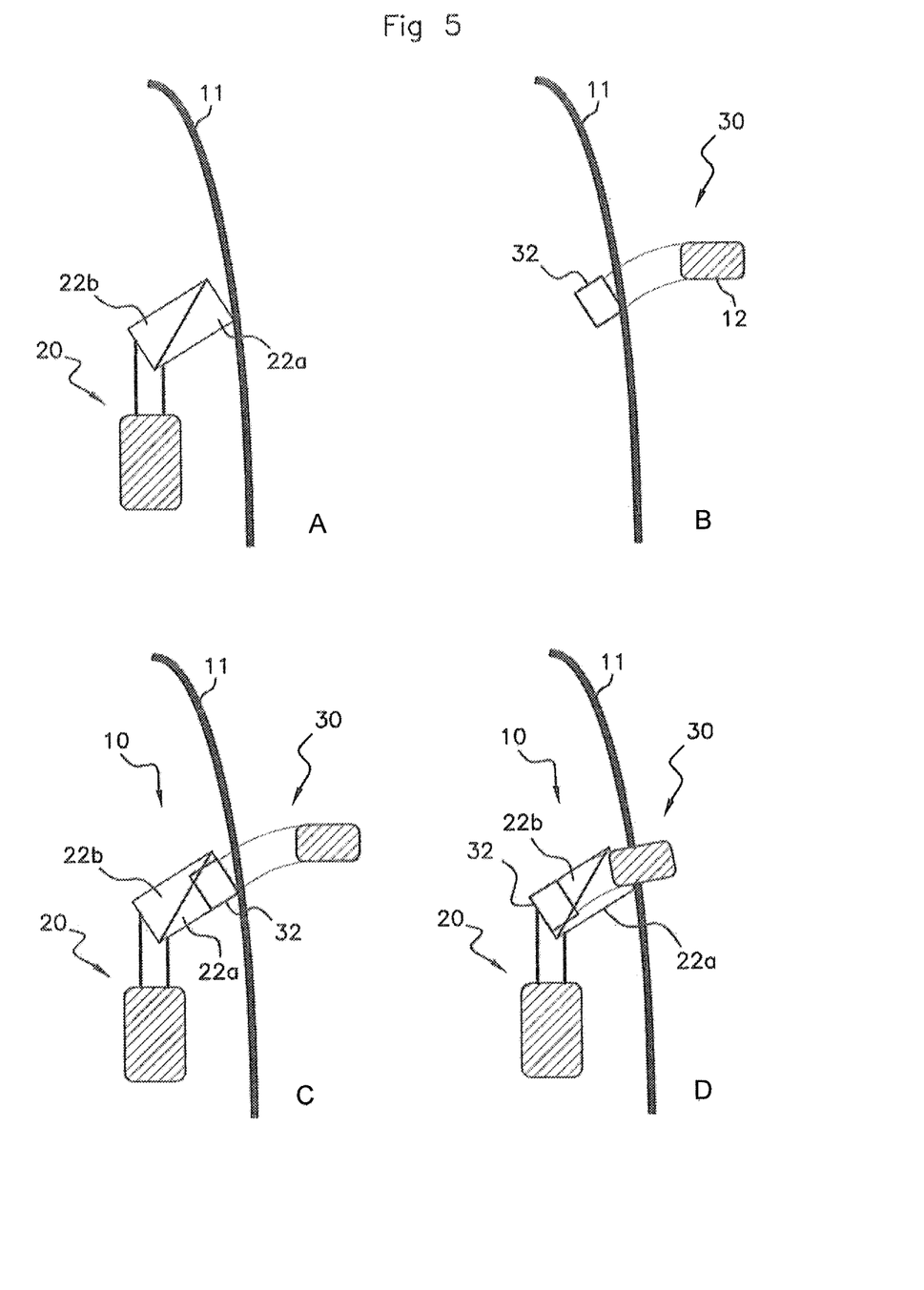
FIGS. 5A-5D show several schematic depictions of the primary module and of the secondary module depending on whether the door handle is in the retracted or deployed position.

FIG. 5A schematically shows, in a sectional view, a primary module 20 positioned in a door 11 of a motor vehicle. It is possible to see here in particular the primary coils 22a and 22b of the primary circuit 21, facing which the secondary coil 32 moves with a linear translational movement.

FIG. 5B schematically shows, in the same sectional view, a secondary module 30 integrated into the deployable door handle 12. It is possible to see here in particular the secondary coil 32. In this figure, the handle is in the deployed position.

FIG. 5C schematically shows, in the same sectional view, the complete device 10 comprising the primary module 20 and the secondary module 30. In this figure, the handle is in the deployed position. In other words, the secondary coil 32 is at the end of travel, facing one of the ends of the primary circuit 21, that is to say that it is mainly facing the first primary coil 22a.

FIG. 5D, the handle is in the retracted position. In other words, the secondary coil 32 is at the end of travel, facing the other end of the primary circuit 21, that is to say that it is mainly facing the second primary coil 22b.

Figure 6:
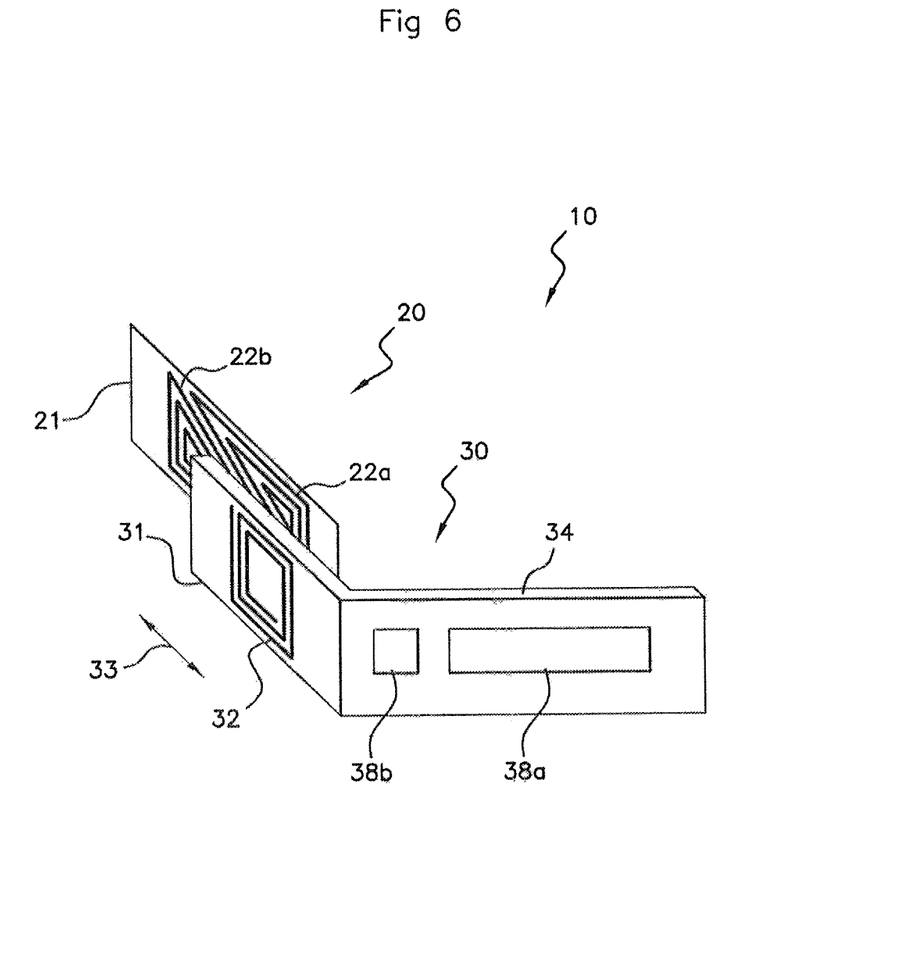
FIG. 6 shows a schematic depiction of one embodiment of the device for forming a door module and a door handle module.

FIG. 6 schematically shows one embodiment of the device 10 comprising a primary module 20 and a secondary module 30. Besides the primary circuit 21 comprising the two primary coils 22a and 22b and the secondary circuit 31 comprising the secondary coil 32 whose path 33 is a linear translational movement in relation to the primary circuit 21, FIG. 6 shows a control circuit 34 comprising two capacitive sensors 38a and 38b. These capacitive sensors are placed on the face of the handle that is flush with the body of the door when the handle is in the retracted position. The sensors may thus for example detect the presence of the hand or of a fob of a user. For example, the sensor 38a may serve to deploy the handle if the hand of a user is detected, and the sensor 38b may serve to lock and unlock the door.

The control circuit 34 may possibly also intervene to authenticate a user, for example by exchanging authentication information through radio communication with a fob of the user.

FIGS. 7A-7D contain several graphs showing the evolution over time of the amplitude of the voltage across the terminals of the primary coils 22a, 22b, of the amplitudes of the strengths of the load currents in the primary coils, and of the amplitude of the voltage across the terminals of the secondary coil.

Figure 7:
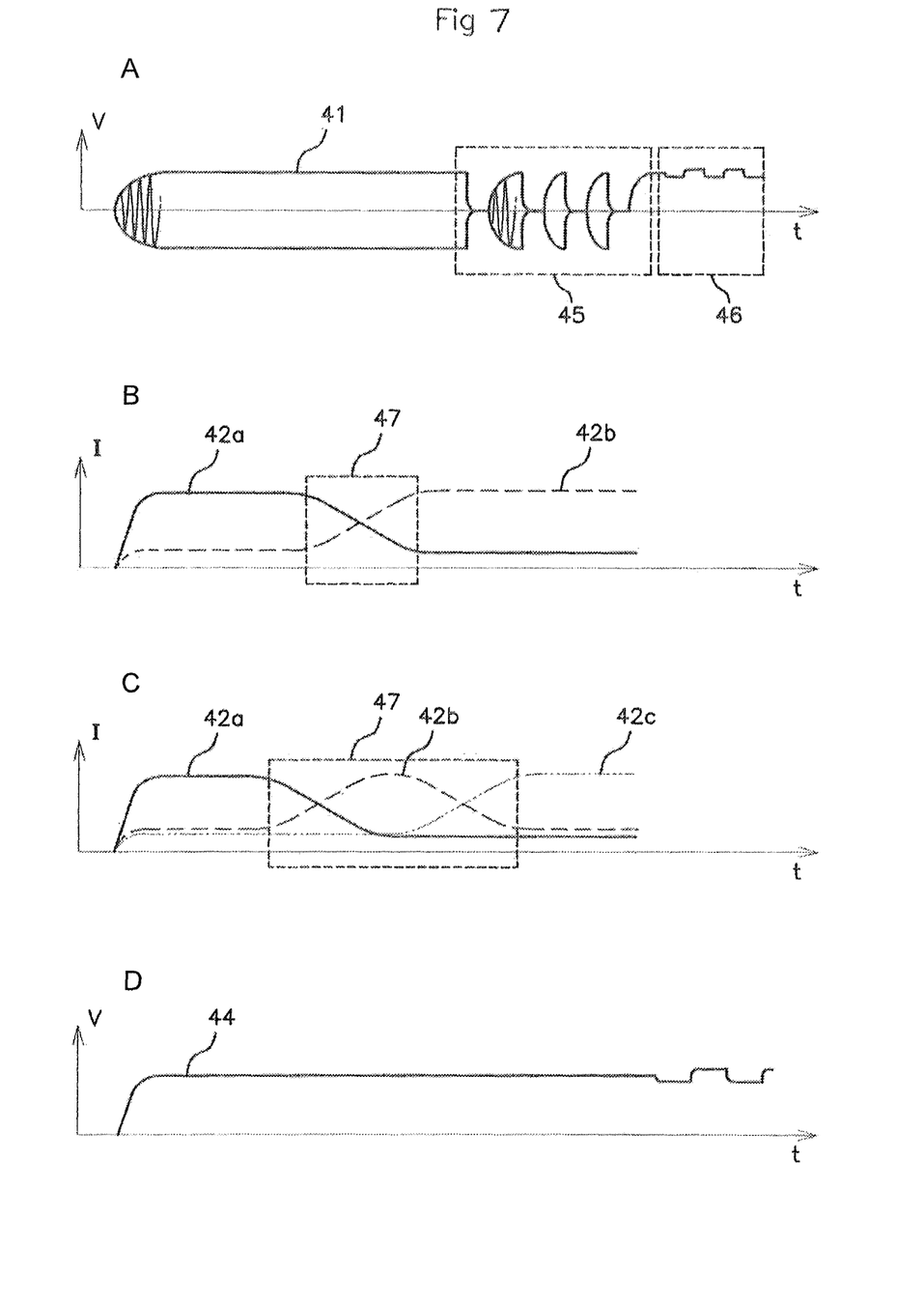
FIGS. 7A-7D show graphs depicting the evolution over time of the amplitude of the voltage across the terminals of the primary coils, of the amplitudes of the strengths of the load currents in the primary coils, and of the amplitude of the voltage across the terminals of the secondary coil.

FIG. 7A shows the evolution over time of the voltage across the terminals of the primary coils 22a and 22b. The curve 41 in particular shows the envelope of the amplitude of the AC voltage applied by the primary module 20 to the terminals of the primary coils.

The amplitude of the voltage across the terminals of the primary coils 22a, 22b is generally constant. It may however be modulated, as shown in part 45 of the graph, so as to create a signal transporting information to be transmitted to the secondary module 30. The control circuit 25 is configured for example so as to generate such a signal.

Therefore, the amplitude of the voltage observed across the terminals of the primary coils may be modulated, as shown in part 46 of the graph, by a signal transporting information transmitted by the secondary module 30 to the primary module 20. Such a signal is generated for example by the secondary module 30 in order to transmit information from the control circuit 34 by modulating the amplitude of a voltage applied across the terminals of the secondary coil 32 by the transmission circuit 36. The electric current flowing through the secondary coil 32 will thus generate an electromagnetic field that will induce the variations in the amplitude of the voltage across the terminals of the primary coils 22a, 22b observed in part 46 of the graph.

Advantageously, the average duration of the periods of information transmission between the primary module 20 and the secondary module 30, such as that shown in part 45 of the graph of FIG. 7A, is short in comparison with the average duration of the periods during which the amplitude of the voltage applied across the terminals of the primary coils 22a, 22b is close to its maximum. For example, the ratio between these two average durations is less than 5%. Thus, the communication of information between the primary module 20 and the secondary module 30 has only a small impact on the efficiency of the inductive transfer of energy to the secondary module 30 by the primary module 20. It may also be contemplated to use relatively high modulation levels, for example of the order of 75% or more, for the modulation of the voltage across the terminals of the primary coils 22a, 22b, such that the average amplitude of the voltage across the terminals of the primary coils during a modulation period, such as that shown by part 45 of the graph, remains relatively high in order to minimize the impact on the inductive transfer of energy to the secondary module 30 by the primary module 20.

It is important to note that, in conventional remote power supply devices, it is known to exchange information in relation to the load (level of charge, charging speed, billing of the supplied energy, etc.) by using coils that are used to transmit electrical energy through magnetic induction. In our example, this furthermore involves transmitting information that is not necessarily linked to the remote power supply function, such as for example information from sensors that detect the presence of the hand or of a fob of a user.

Radio communication through amplitude modulation of a signal is known to those skilled in the art and will therefore not be described in more detail in the present application.

It should be noted that the amplitude modulation used in the embodiment described here is merely a nonlimiting example for encoding signals transporting information between the primary module 20 and the secondary module 30. Therefore, other types of modulation could be used, such as for example frequency modulation or phase modulation, and these would merely represent variants of aspects of the present invention.

FIG. 7B shows the evolution over time of the amplitudes of the strengths of the load currents 42a and 42b measured respectively in the primary coils 22a and 22b. In particular, part 47 of the graph corresponds to a movement of the door handle from the deployed position to the retracted position.

The strength of the load current 42a in the first primary coil 22a varies in correlation with the surface area of the first primary coil 22a facing the secondary coil 32. Specifically, the greater this surface area, the greater the amplitude of the magnetic field flux generated by the first primary coil 22a through the secondary coil 32, in other words, the stronger the inductive coupling between the first primary coil 22a and the secondary coil 32, the greater the amplitude of the strength of the load current 42a is as a result.

In the light of the arrangement of the coils as described above with reference to FIGS. 2 and 5A-5D, the amplitude of the strength of the load current 42a is therefore at a maximum when the secondary coil is at the end of travel at the end of the primary circuit 21 for which the surface area of the first primary coil 22a that is facing the secondary coil 32 is at a maximum. In this position, the door handle is deployed. In this position, the amplitude of the strength of the load current 42a flowing in the second primary coil 22b is at a minimum because, in this position, the surface area of the second primary coil 22b facing the secondary coil 32 is at a minimum, and therefore the inductive coupling between the second primary coil 22b and the secondary coil 32 is also at a minimum.

When the secondary coil moves toward the other end of the primary circuit 21, that is to say when the door handle retracts, the surface area of the first primary coil 22a facing the secondary coil 32 gradually decreases, and the same applies for the amplitude of the strength of the load current 42a in the first primary coil 22a. By contrast, the surface area of the second primary coil 22b facing the secondary coil 32 gradually increases, and the same applies for the amplitude of the strength of the load current 42b in the second primary coil 22b. This is illustrated in part 47.

When the door handle is in the retracted position, the secondary coil 32 reaches the end of travel at the other end of the primary circuit. In this position, the amplitude of the strength of the load current 42a in the first primary coil 22a is at a minimum, whereas the amplitude of the strength of the load current 42b in the second primary coil 22b is at a maximum.

Thus, a unique value of the amplitude of the strength of the load current 42a in the first primary coil 22a and of the amplitude of the strength of the load current 42b in the second primary coil 22b corresponds to each position of the secondary coil 32 in relation to the primary circuit 21 (cf. part 47). It is thus possible to uniquely determine the position of the secondary circuit 31 in relation to the primary circuit 21 on the basis of the value of the amplitude of the strength of one or both load currents 42a and 42b. For example, the estimated position of the secondary circuit 31 in relation to the primary circuit 21 may be defined as being the average of the positions estimated from each of the values of the amplitudes of the strengths of the load currents 42a and 42b.

It should be noted in the example described here that it is considered that the primary coils 22a and 22b are fixed in relation to the primary circuit 21, that the primary circuit 21 is fixed in relation to the primary module 20, that the secondary coil 32 is fixed in relation to the secondary circuit 31, and that the secondary circuit 31 is fixed in relation to the secondary module 30. Thus, estimating the position of the secondary coil in relation to the primary coils is equivalent to estimating the position of the secondary circuit in relation to the primary circuit, or to estimating the position of the secondary module in relation to the primary module.

Estimating the position of the secondary module 30 in relation to the primary module 20 then makes it possible to control the motor responsible for deploying the door handle.

FIG. 7C shows the evolution over time of the amplitudes of the strengths of the load currents 42a, 42b and 42c measured respectively in the primary coils 22a, 22b and 22c for the particular embodiment described with reference to FIG. 3, and in which three primary coils are used. In this example, it is necessary to take into account the three values of the amplitudes of the strengths of the load currents measured for the three primary coils 22a, 22b and 22c in order to be able to estimate the position of the secondary coil 32. Specifically, on part 47 of the graph, which corresponds to a movement of the secondary module 30, it is clearly apparent that a unique value of the triplet formed by the values of the amplitudes of the strengths of the load currents 42a, 42b and 42c corresponds to each position of the secondary coil 32 during its movement.

For the particular embodiment described with reference to FIG. 4, the graphical depiction of the variation in the amplitude of the strength of the load current flowing through each primary coil 22a, 22b and 22c during the movement of the secondary module 30 would be equivalent to that in FIG. 7B.

It should be noted that zone 47 of the graphs of FIGS. 7B and 7C show the travel length of the secondary coil 32 during the movement of the secondary module 30, for which it is possible to estimate the position of the secondary coil, and therefore also the position of the secondary module 30 in relation to the primary module 20. However, there is nothing to prevent the movement of the secondary module 30 extending beyond this zone if the position of the secondary module is unimportant when it is situated beyond this zone.

It should also be noted that other parameters representative of the amplitude of the magnetic field flux generated by each primary coil through the secondary coil could be used. Thus, rather than using the amplitudes of the strengths of the load currents for the primary coils, it would be possible for example to measure the amplitudes of the load voltages in the primary coils if it is considered that they are supplied by an AC current source (and not by an AC voltage source).

FIG. 7D shows the evolution over time of the amplitude 44 of the voltage across the terminals of the secondary coil 32. This voltage is induced by the magnetic fields 23a and 23b generated respectively by the primary coils 22a and 22b and passing through the secondary coil 32. As explained above, since the sum of the surface areas of the primary coils 22a and 22b facing the secondary coil 32 is substantially constant during the movement of the secondary module, the amplitude of the total magnetic field flux generated by the set of primary coils through the secondary coil is also substantially constant regardless of the position of the secondary coil. The amplitude 44 of the voltage induced by the primary coils 22a and 22b in the secondary coil 32 is therefore constant regardless of the position of the primary circuit 21 in relation to the secondary circuit 31 during the movement of the handle from the deployed position to the retracted position and vice versa. The transmission of energy, through inductive coupling, from the primary module 20 to the secondary module 30 therefore takes place efficiently and continuously regardless of the position of the door handle. The remote supply of power to the door handle module 20 is therefore continuous, even during the deployment of the handle.

An aspect of the invention thus overcomes the drawbacks from the prior art by proposing a remote power supply device 10 in which a secondary module 30 is able to move in relation to a primary module 20, and that is able to be used to perform other functions, such as for example estimating the position of the secondary module or for wireless communication between the two modules.

Aspects of the invention are however not limited to the exemplary embodiments that are described and shown. In particular, the shape and the arrangement of the primary coils and of the secondary coil as shown in FIGS. 2 to 4 should not be interpreted as limiting. The same applies for the movement of the secondary circuit in relation to the primary circuit, which is not necessarily limited to a translational movement.

It should also be noted that, although the embodiments described above relate to a motor vehicle door, an aspect of the invention may very well apply to other opening elements in general.

More generally, although the an aspect of invention is particularly well-suited to producing a system for a deployable door handle, it may also be contemplated to use it for other applications in which it is desirable to remotely supply power to a secondary module that moves in relation to a primary module and whose position it is desired to estimate.

The invention claimed is:

1. A system including a motor vehicle door and a handle able to be deployed in relation to said door, including a wireless electric power supply device including a primary module integrated into the door and a secondary module integrated into the handle, said primary module being configured so as to form an electromagnetic field able to supply electric power to said secondary module through magnetic induction, the handle comprising a control circuit comprising sensors in order to detect presence of a hand or of a fob of a user, wherein the secondary module is able to move in relation to the primary module on a predetermined path, said primary module comprises at least two primary coils and said secondary module comprises a secondary coil, said primary coils and said secondary coil being configured such that:

the primary coils form respective magnetic fields oriented in a same direction along respective axes of said primary coils, when the secondary module moves along the path, the secondary coil moves from a first primary coil to a second primary coil, an amplitude of a total magnetic field flux generated by the primary coils through the secondary coil is substantially constant, allowing a continuous remote supply of power to the secondary module by the primary module regardless of a position of the secondary module on the path, the primary module includes an electronic control circuit, furthermore configured so as to modulate an amplitude of a voltage across the terminals of the primary coils on a basis of an item of information from the electronic control circuit to be transmitted to the secondary module, the secondary module furthermore includes an electronic transmission circuit, configured so as to modulate the amplitude of a voltage across the terminals of the secondary coil on the basis of an item of information to be transmitted to the primary module.

2. The system as claimed in claim 1, wherein the electronic control circuit of the primary module is configured so as to measure, for each primary coil, a parameter representative of an amplitude of the total magnetic field flux generated by the primary coil under consideration through the secondary coil, and so as to estimate the position of the secondary module on the path on a basis of said measured parameter for each primary coil.

3. The system as claimed in claim 2, wherein the parameter representative of the amplitude of the total magnetic field flux generated by a primary coil through the secondary coil is an amplitude of a strength of a load current flowing in said primary coil.

4. The system as claimed in claim 3, wherein the electronic control circuit of the primary module is furthermore configured so as to control, on a basis of the estimated position of the secondary module, a motor that moves said secondary module in relation to the primary module.

5. The system as claimed in claim 2, wherein the electronic control circuit of the primary module is furthermore configured so as to control, on a basis of the estimated position of the secondary module, a motor that moves said secondary module in relation to the primary module.

6. The system as claimed in claim 1, wherein the secondary module includes an electronic "remote power supply" circuit, configured so as to recover the electrical energy transmitted through magnetic induction between at least one of the primary coils and the secondary coil so as to supply the secondary module with a DC-voltage electric power supply regardless of the position of the secondary module on the path.

7. The system as claimed in claim 1, wherein the path followed by the secondary module corresponds to a translational movement of said secondary module in relation to the primary module.

8. The system as claimed in claim 1, wherein said primary coils and secondary coil are configured such that: when the secondary module moves along the path, the secondary coil moves from a first primary coil to a second primary coil, a surface area of the first primary coil facing the secondary coil evolving an opposite way to the surface area of the second primary coil facing the secondary coil, a sum of the surface areas of the primary coils facing the secondary coil is substantially constant regardless of the position of the secondary module on the path.

9. The system as claimed in claim 8, wherein:

the first primary coil and the second primary coil each has an axis parallel to one another and each has an identical right-angled triangle shape in a plane orthogonal to said axes, the first primary coil and the second primary coil are arranged such that the two right-angled triangle shapes form a rectangle, and hypotenuses of the right-angled triangle shapes being positioned facing one another and forming a diagonal of the rectangle, the secondary coil has the shape of a rectangle in a plane orthogonal to an axis of said secondary coil, 1 the secondary module moves in a translational movement along a length or a width of the rectangle formed by the first primary coil and the second primary coil.

10. The system as claimed in claim 1, wherein, when the secondary module moves along the path, the secondary coil moves from the first primary coil to the second primary coil, a number of turns of the first primary coil facing the secondary coil evolving in an opposite way to a number of turns of the second primary coil facing the secondary coil.

11. A motor vehicle, comprising the system as claimed in claim 1.

* * * * *

UNITED STATES PATENT AND TRADEMARK OFFICE
CERTIFICATE OF CORRECTION

PATENT NO. : 10,689,880 B2
APPLICATION NO. : 16/480364
DATED : June 23, 2020
INVENTOR(S) : Olivier Gerardiere, Gabriel Spick and Yannis Escalante Page 1 of 1

It is certified that error appears in the above-identified patent and that said Letters Patent is hereby corrected as shown below:

In the Claims

In Column 16, Line 14, Claim 6, ""remote power supply"" should be -- remote power supply --.
In Column 16, Line 46, Claim 9, "..coil, 1" should be -- coil, --.

Signed and Sealed this
Eighteenth Day of August, 2020

Andrei Iancu
*Director of the United States Patent and Trademark Office*